US007065615B2

(12) United States Patent
Sugino et al.

(10) Patent No.: US 7,065,615 B2
(45) Date of Patent: Jun. 20, 2006

(54) STORAGE CONTROL SYSTEM STORING OPERATION INFORMATION

(75) Inventors: Shoji Sugino, Odawara (JP); Masanobu Yamamoto, Odawara (JP)

(73) Assignee: Hitachi, Ltd., Tokyo (JP)

( * ) Notice: Subject to any disclaimer, the term of this patent is extended or adjusted under 35 U.S.C. 154(b) by 110 days.

(21) Appl. No.: 10/784,796

(22) Filed: Feb. 24, 2004

(65) Prior Publication Data
US 2005/0154828 A1 Jul. 14, 2005

(30) Foreign Application Priority Data
Jan. 9, 2004 (JP) ............................. 2004-004540

(51) Int. Cl.
*G06F 12/00* (2006.01)
(52) U.S. Cl. ...................... 711/154; 711/112; 711/114; 711/156
(58) Field of Classification Search ................ 711/112, 711/114
See application file for complete search history.

(56) References Cited

U.S. PATENT DOCUMENTS

| 4,241,420 | A | * | 12/1980 | Fish et al. .................. 711/112 |
| 5,455,934 | A | * | 10/1995 | Holland et al. ............... 711/4 |
| 5,944,789 | A | * | 8/1999 | Tzelnic et al. .............. 709/214 |
| 6,665,740 | B1 | | 12/2003 | Mason, Jr. et al. |
| 6,694,405 | B1 | | 2/2004 | Lam et al. |
| 6,810,462 | B1 | * | 10/2004 | Matsunami et al. ........ 711/112 |
| 6,865,643 | B1 | * | 6/2005 | Baxter, III ................. 711/114 |
| 6,910,098 | B1 | * | 6/2005 | LeCrone et al. ............ 711/112 |
| 2002/0038391 | A1 | * | 3/2002 | Ido et al. ........................ 710/6 |
| 2002/0124140 | A1 | | 9/2002 | Kawaguchi et al. |
| 2003/0135685 | A1 | * | 7/2003 | Cowan ........................ 710/308 |
| 2004/0128453 | A1 | * | 7/2004 | Ido et al. ..................... 711/147 |
| 2004/0193827 | A1 | | 9/2004 | Mogi et al. |

FOREIGN PATENT DOCUMENTS

JP 6-274280 3/1993

\* cited by examiner

*Primary Examiner*—Matthew Kim
*Assistant Examiner*—Jonathan Barton
(74) *Attorney, Agent, or Firm*—Reed Smith LLP; Stanley P. Fisher, Esq.; Juan Carlos A. Marquez, Esq.

(57) ABSTRACT

It is an object of the present invention to reduce a burden on a maintenance terminal of a storage control system. A storage control system 13 includes one or more operation information storages 59 in which operation information of the storage control system 13 is stored. Among plural DKAs 43 in the storage control system 13, a representative DKA 43D connected to the operation information storage 59 reads out operation information stored in an SM 39 and stores the operation information in the operation information storage 59. The operation information stored in the operation information storage 59 is outputted to an SVP 11 in a form in which the operation information is not stored in an HDD 7 of the SVP 11.

6 Claims, 10 Drawing Sheets

| # | HEADING | ITEM |
|---|---|---|
| 1 | PROCESSOR PERFORMANCE | CHP OPERATING RATE (%) |
| 2 | | DKP OPERATING RATE (%) |
| 3 | | DRR OPERATING RATE (%) |
| 4 | CACHE PERFORMANCE VALUE | CACHE USE RATE (%) |
| 5 | | WRITE PENDING (%) |
| 6 | | SIDE FILE USAGE (%) |
| 7 | | ASYNC WRITE PENDING (%) |
| 8 | | READ HIT RATE (%) |
| 9 | ACCESS PATH OPERATING RATE | CHA SM AccessPath (%) |
| 10 | | DKA SM AccessPath (%) |
| 11 | | CHA CM AccessPath (%) |
| 12 | | DKA CM AccessPath (%) |
| 13 | PORT PERFORMANCE | THROUGHPUT (IOPS) |
| 14 | | DATA TRANSFER RATE (MB/s) |
| 15 | | RESPONSE TIME [ms] |
| 16 | WWN PERFORMANCE | THROUGHPUT (IOPS) |
| 17 | | DATA TRANSFER RATE (KB/s) |
| 18 | | RESPONSE TIME [ms] |

CONNECTED TO FIG. 3

FIG. 3

CONNECTED TO FIG. 2

| 19 | LUN PERFORMANCE | THROUGHPUT (IOPS) |
| --- | --- | --- |
| 20 | | DATA TRANSFER RATE (MB/s) |
| 21 | | READ IO PERFORMANCE (IOPS) |
| 22 | | WRITE IO PERFORMANCE (IOPS) |
| 23 | | READ HIT RATE (%) |
| 24 | | WRITE HIT RATE (%) |
| 25 | | BACKEND PERFORMANCE (COUNTER NUMBER) |
| 26 | PG/LDEV PERFORMANCE | THROUGHPUT (IOPS) |
| 27 | | DATA TRANSFER RATE (MB/s) |
| 28 | | READ IO PERFORMANCE (IOPS) |
| 29 | | WRITE IO PERFORMANCE (IOPS) |
| 30 | | READ HIT RATE (%) |
| 31 | | WRITE HIT RATE (%) |
| 32 | | BACKEND PERFORMANCE (COUNTER NUMBER) |
| 33 | | DRIVE OPERATING RATE (%) |
| 34 | | R/W SEQ. /RND. ACCESS RATIO |

STORAGE CONTROL SYSTEM STORING OPERATION INFORMATION

CROSS-REFERENCES TO RELATED APPLICATIONS

This application relates to and claims priority from Japanese Patent Application No. 2004-004540, filed on Jan. 9, 2004, the entire disclosure of which is incorporated herein by reference.

BACKGROUND OF THE INVENTION

1. Field of the Invention

The present invention relates to a storage control system storing operation information, and more specifically to, for example, a storage control system which is constituted by arranging a large number of disk type storages in array.

2. Description of the Related Art

For example, there is known a technique for storing system environment information of a workstation in a portable storage medium such as a flexible disk, storing the system environment information in a hard disk from the portable storage medium, and reading out the system environment information to the portable storage medium from the hard disk to back up the system environment information (e.g., JP-A-6-274280).

Incidentally, for example, in a storage system for basic businesses handling a large volume of data, the data is managed using a storage control system which is constituted separately from a host computer (hereinafter simply referred to as "host"). This storage control system is, for example, RAID (Redundant Array of Independent Inexpensive Disks) which is also called a storage control system and is constituted by arranging a large number of disk type storages in array.

In such a storage system, a maintenance terminal (e.g., personal computer) for managing an operation state of the storage control system may be provided. The maintenance terminal is connected to the storage control system via, for example, a LAN. Operation information, which is generated in the storage control system, is sent to the maintenance terminal and stored in the maintenance terminal.

However, the storage of operation information is a significant burden for the maintenance terminal. This is because operation information of, for example, several MB (e.g., 6 megabyte) per minute is generated in the storage control system, the operation information amounts to enormous information amount in several hours, and communicating and storing such a large amount of operation information become a processing burden for the maintenance terminal to interfere with processing for maintenance and consume a large storage capacity of the maintenance terminal.

SUMMARY OF THE INVENTION

Therefore, it is an object of the present invention to reduce a burden on a maintenance terminal of a storage control system. More specifically, for example, it is an object of the present invention to reduce a processing burden and/or a communication burden of the maintenance terminal of the storage control system.

Other objects of the present invention will become apparent from descriptions which follow.

A storage control system in accordance with a first aspect of the present invention is a storage control system which is connected to a host apparatus and a maintenance terminal, the storage control system including: one or more channel adapters to be a communication interface with respect to the host apparatus; one or more host data storages in which data from the host apparatus is stored; one or more disk adapters to be a communication interface with respect to the one or more host data storages; one or more operation information storage memories in which operation information of the storage control system is stored; and a memory connection section for connecting the maintenance terminal to the operation information storage memory. One or more channel processors are mounted to the respective channel adapters. One or more disk processors are mounted to the respective disk adapters. The respective channel processors and the respective disk processors store operation information in the one or more operation information storage memories. The memory control system outputs the stored operation information directly to the maintenance terminal via the memory connection section in a form in which the operation information stored in the operation information storage memories is stored in a storage for the maintenance terminal.

A storage control system in accordance with a second aspect of the present invention is a storage control system which is connected to a host apparatus and a maintenance terminal, the storage control system including: one or more channel adapters to be a communication interface with respect to the host apparatus; one or more host data storages in which data from the host apparatus is stored; one or more operation information storages in which operation information of the storage control system is stored; one or more operation information storage memories in which operation information of the storage control system is stored; one or more first disk adapters to be a communication interface with respect to the one or more host data storages; and one or more second disk adapters to be a communication interface with respect to the one or more operation information storages. One or more channel processors are mounted to the respective channel adapters. One or more first disk processors are mounted to the respective first disk adapters. The respective channel processors and the respective first disk processors store operation information in the one or more operation information storage memories. The one or more second disk adapters read out the stored operation information from the one or more operation information storage memories to store the operation information in the one or more operation information storages. The storage control system outputs the stored operation information to the maintenance terminal in a form in which the operation information stored in the one or more operation information storages is not stored in a storage for the maintenance terminal.

According to the storage control system in accordance with the first and the second aspects of the present invention, a burden on the maintenance terminal is reduced.

DESCRIPTION OF THE PREFERRED EMBODIMENTS

Embodiments of the present invention will be hereinafter described with reference to the accompanying drawings.

Figure 1:
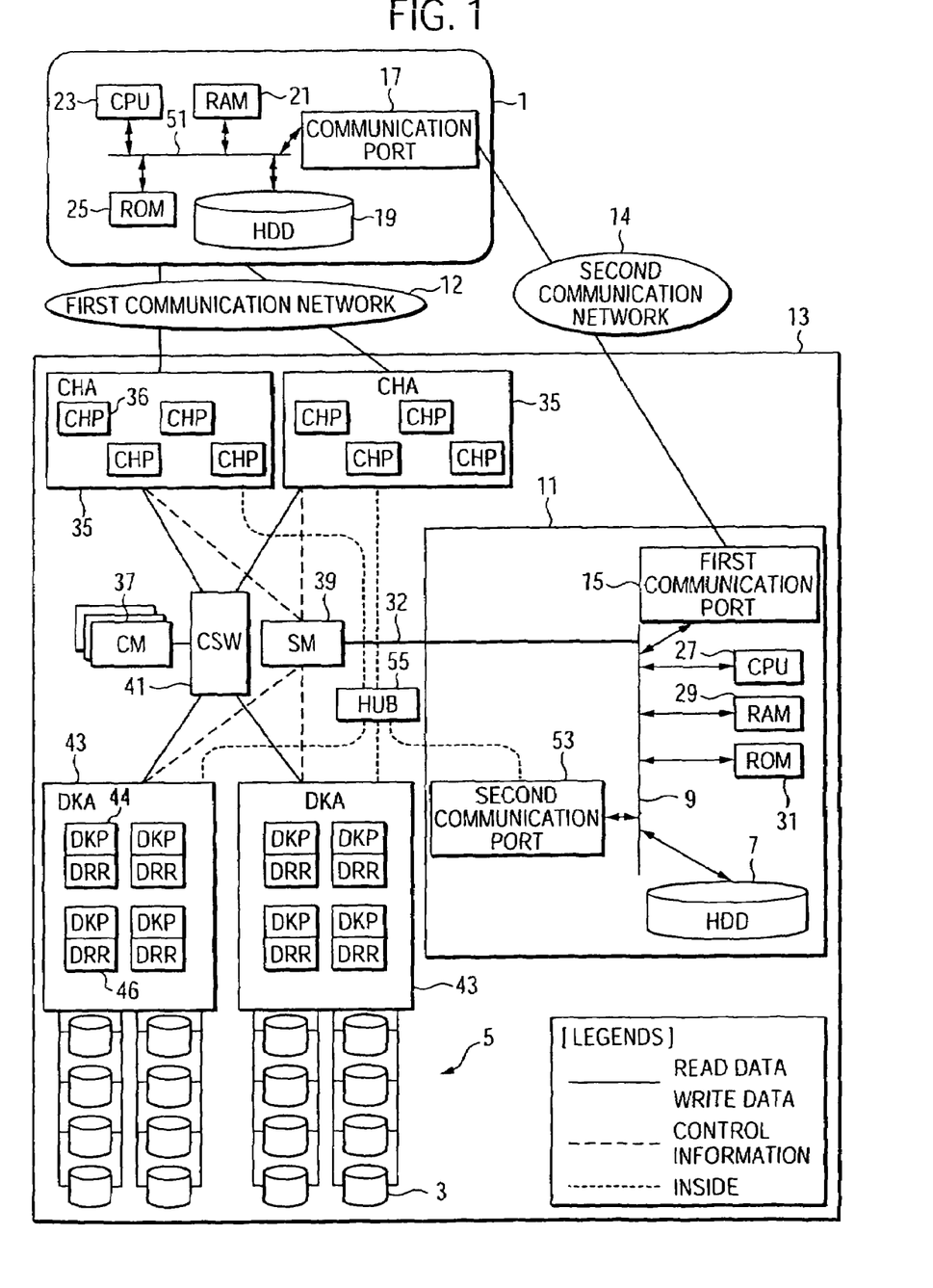
FIG. 1 shows an overall structure of a storage control system in accordance with a first embodiment of the present invention.

FIG. 1 shows an overall structure of a storage control system in accordance with a first embodiment of the present invention.

One or more host terminals 1 are connected to a storage control system 13 (e.g., RAID) via a first communication network (e.g., SAN (Storage Area Network)) 12. In this case, it is also possible that plural storage control systems 13 are connected to one host terminal 1, plural host terminals 1 are connected to one storage control system 13, or the storage control system 13 is connected to other storage control systems and the host terminal 1 accesses the other storage control systems via the storage control system 13.

The host terminal 1 is, for example, a personal computer, a workstation, or the like, which is a computer system including a CPU (Central Processing Unit) 23, a nonvolatile and/or volatile memory (e.g., a ROM 25 or a RAM 21), a hard disk drive 19, a communication port 17, and the like as hardware resources. The CPU 23 of the host terminal 1 reads various programs from a predetermined storage area (e.g., from the ROM 25 via an internal bus 51) and executes the programs, whereby various functions are realized. The host terminal 1 is connected to a maintenance terminal (hereinafter referred to as "SVP" which is an abbreviation of Service Processor) 11, which is described later, from the communication port 17 via a second communication network (e.g., LAN) 14.

Although not shown in the figure, this host terminal 1 includes one or more application programs (hereinafter referred to as "AP") and an operating system (hereinafter referred to as "OS"). The AP issues, for example, an I/O request including a logical volume number to be described later, which indicates a reading-out destination or a storage destination of data, to the storage control system 13 via the OS 3.

The storage control system 13 includes one or more physical disk groups 5 held by plural disk type storages 3 which are arranged in array. Plural not-shown logical volumes (logical units), which are logical storage areas, are set on physical storage areas provided by the physical disk groups 5. The storage control system 13 includes a channel control unit, one or more cache memories (hereinafter abbreviated as "CMs") 37, one or more shared memories (hereinafter abbreviated as "SMs") 39, a disk control unit, a cache switch (hereinafter abbreviated as "CSW") 41, and the maintenance terminal 11.

The channel control unit is a unit for controlling communication between the storage control system 13 and the host terminal 1 in a connection destination, and includes one or more channel adapter sets. Plural (typically, two) channel adapters (hereinafter abbreviated as "CHAs") 35, which are connected to the one or more host terminals 1, are included in the respective channel adapter sets. The CHAs 35 have substantially an identical constitution. Consequently, for example, in the case in which the host terminal 1 cannot access a logical volume via one CHA 35, the host terminal 1 accesses the identical logical volume via the other CHA 35. The respective CHAs 35 can be constituted by a hardware circuit, software, or a combination of the hardware circuit and the software, and perform data communication between the storage control system 13 and the host terminal 1. One or more microprocessors (hereinafter referred to as "channel processors") 36 which are connected to the one or more host terminals 1, a not-shown microprocessor adapter (hereinafter abbreviated as "MPA") to be connected to the SM 39, and a not-shown data transfer adapter (hereinafter abbreviated as "DTA") to be connected to the CM 37 are mounted to the CHA 35. In the case in which, for example, the channel processor (hereinafter abbreviated as "CHP") 36 sends and receives control information (e.g., inter-processor message) to and from a disk processor (hereinafter abbreviated as "DKP") 44 to be described later, the control information is sent and received via the MPA. In addition, in the case in which data is written in a logical volume from the host terminal 1 (the data to be written will be hereinafter referred to as "write data") and in the case in which data read out from the logical volume (the data to be read out will be hereinafter referred to as "read data") is outputted to the host terminal 1 from the storage control system 13, the write data and the read data pass the DTA. The respective CHPs 36, for example, poll a predetermined storage area of the SM 39 to acquire control information via the MPA, store various commands received from the host terminal 1 in the SM 39, read out read data stored in the CM 37 via the CSW 41 to send the read data to the host terminal 1, store write data received from the host terminal 1 in the CM 37 via the CSW 41, and write various kinds of operation information to be described later in a first storage area (not shown) prepared in the SM 39.

The respective CMs 37 are volatile or nonvolatile memories. Write data, which is transferred from the CHA 35 to a disk adapter (hereinafter abbreviated as "DKA") 43 to be described later, and read data, which is transferred from the DKA 43 to the CHA 35, are temporarily stored in the CM 37.

The SM 39 is a nonvolatile or volatile memory which is shared by the CHP 36 and the DKP 44. In SM 39, for example, there are a first storage area, in which operation information is written, and a second storage area, in which the control information is written.

The disk control unit is a unit for controlling the respective physical disk groups 5 and includes a disk adapter set (not shown) prepared for each of the physical disk groups 5. The disk adapter set includes plural (typically, two) disk adapters 43. The respective disk adapters (hereinafter abbreviated as "DKAs") 43 include one or more microprocessors (hereinafter referred to as "disk processors") 44 and perform reading-out or writing of data with respect to a logical volume having a logical volume number (hereinafter abbreviated as "LUN"), which is designated by the host terminal 1, according to processing of the disk processor (hereinafter abbreviated as "DKP") 44 (the logical volume may be identified not only by the LUN but also by other codes). In addition, the respective DKAs 43 include one or more microprocessors (hereinafter referred to as "DRRs" which is an abbreviation of processors for Data Recover and Reconstruct) 46 to be used for restoration and reestablishment of data, generation of parity, and the like, and performs restoration of data and the like in the logical volume with the DRR 46.

The CSW 41 can be constituted as, for example, a high-speed bus such as an ultrahigh speed cross bus switch which performs data transfer according to a high-speed switching operation. The CSW 41 connects the respective CHAs 35, the respective DKAs 43, and the CM 37 selected out of the one or more CMs 37. The exchange of data and commands among the respective CHAs 35, the respective DKAs 43, and the CM 37 is performed via the CSW 41.

The above is a schematic constitution of the storage control system 13 in accordance with this embodiment. The storage control system 13 receives an I/O request from the AP of the host terminal 1 and executes processing based upon contents of the I/O request.

An outline of a processing flow of an I/O request in the storage control system 13 will be hereinafter described. Note that, in the description, a case in which an issued I/O request indicates a read request and a case in which an issued I/O request indicates a write request will be described separately. In addition, it is assumed that the I/O request includes an LUN of a logical volume which will be a reading-out destination of read data or a storage destination of write data.

(1) Case in which an I/O request indicates a read request

The CHA 35 receives an issued I/O request from the host terminal 1 and judges whether or not data which is requested to be read in the I/O request (i.e., read data) exists in a predetermined storage area (predetermined cache slot) of the CM 37.

In the case in which a result of the judgment is affirmative, that is, in the case in which the read data exists in the predetermined cache slot (in the case of cash hit), the CHA 35 acquires the read data from the predetermined cache slot and sends the read data to the host terminal 1.

On the other hand, in the case in which a result of the judgment is negative, that is, in the case in which read data does not exist in the predetermined cache slot (in the case of cache miss), the CHA 35 stores, in the second storage area of the SM 39, control information for instructing to read read data in a logical volume (hereinafter referred to as "target volume"), to which the LUN included in the I/O request is allocated, in the predetermined cache slot once. The DKA 43 reads out the control information, whereby the read data is read from the target volume and stored in the predetermined cache slot by the DKA 43. Thereafter, the CHA 35 acquires the read data from the CM 37 and sends the read data to the host terminal 1.

(2) Case in which an I/O request indicates a write request

The CHA 35 receives an I/O request including write data from the host terminal 1 and judges whether or not data exists in a predetermined cache slot on the CM 37.

In the case in which a result of the judgment is affirmative, that is, data exists in the predetermined cache slot (in the case of cash hit), the CHA 35 overwrites the write data included in the I/O request on the data in the predetermined cache slot.

On the other hand, in the case in which a result of the judgment is negative, that is, data does not exist in the predetermined cache slot (in the case of cache miss), the CHA 35 stores, in the SM 39, control information for instructing to read data from a target volume and store the data in the predetermined cache slot once. When the control information is read out, the DKA 43 reads the data from the target volume and stores the data in the predetermined cache slot. The CHA 35 overwrites the write data included in the received I/O request on the data stored in the predetermined cache slot.

Therefore, when write data is written in the CM 37, assuming that the write request has been completed, an end report is returned to the host terminal 1 from the storage control system 13. Note that, at the point when the write data is written in the CM 37, in general, the data is not reflected on the target volume. Thereafter, the write data is read out from the CM 37 by the DKA 43 and written in the target volume.

The above is the schematic constitution of the storage system in accordance with this embodiment. Note that, in this storage system, for example, the DKA 43 and the respective physical disk groups 5 may be connected directly or may be connected indirectly via a network. In addition, the physical disk groups 5 and DKA43 may be conducted integrally. In addition, it is also possible that one logical volume is allocated to each of the CHAs 35, one logical volume is allocated to plural CHAS, or one logical volume is shared by plural CHAs.

Main components of the storage control system in accordance with this first embodiment will be hereinafter described in detail.

The respective CHAs 35 and the respective DKAs 43 are connected to the maintenance terminal 11 via a switch such as an HUB 55. The respective CHPs 36 of the respective CHAs 35 as well as the respective DKPs 44 and the respective DRRs 46 of the respective DKA 43 receive a command from the SVP 11 via the HUB 55 and execute processing in accordance with the received command (e.g., the DKPs 44 stop driving of the DKPs 44 in response to the command).

The SVP 11 is, for example, a personal computer, a workstation, or the like, which is a computer system including a CPU (Central Processing Unit) 27, a nonvolatile and/or volatile memory (e.g., a ROM 31 or a RAM 21), a hard disk drive 7, a first communication port 15, a second communication port 53, and the like as hardware resources. The CPU 27 of the SVP 11 reads various programs from a predetermined storage area (e.g., from the ROM 31 via an internal bus 9) and executes the programs, whereby various functions are realized. The SVP 11 is connected to the host terminal 1 from the first communication port 15 via a second communication network (e.g., LAN), and is connected to the respective CHAs 35 and the respective DKAs 43 via the second communication port 53 and connected to the SM 39.

Although not shown in the figure, the SVP 11 includes an OS and one or more APs. For example, a maintenance AP sends a command to a predetermined processor via the second communication port 53, reads out operation information in the SM 39 to store the operation information in an HDD 7, and sends a report based upon a result of the operation information stored in the HDD 7 to an arbitrary external terminal (e.g., the host apparatus 1 or an information processing terminal of a management center performing maintenance work) via the second communication network 14.

Incidentally, in the first embodiment, plural kinds of operation information are stored in the first storage area of the SM 39. The plural kinds of operation information are read out by the SVP 11, and the maintenance AP of the SVP 11 calculates information on plural kinds of monitor items on the basis of the plural kinds of operation information and displays the information on a display screen.

Figure 2:
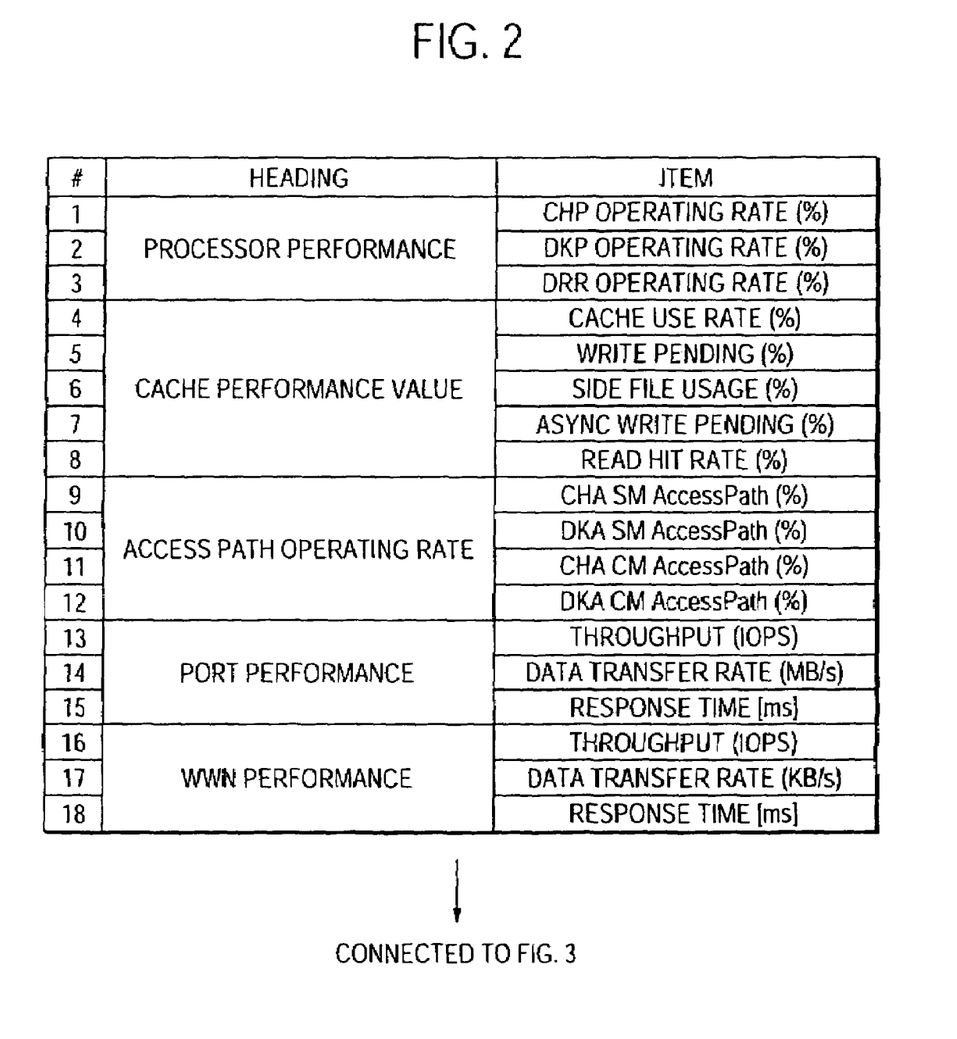
FIG. 2 shows examples of first to eighteenth monitor items.
Figure 3:
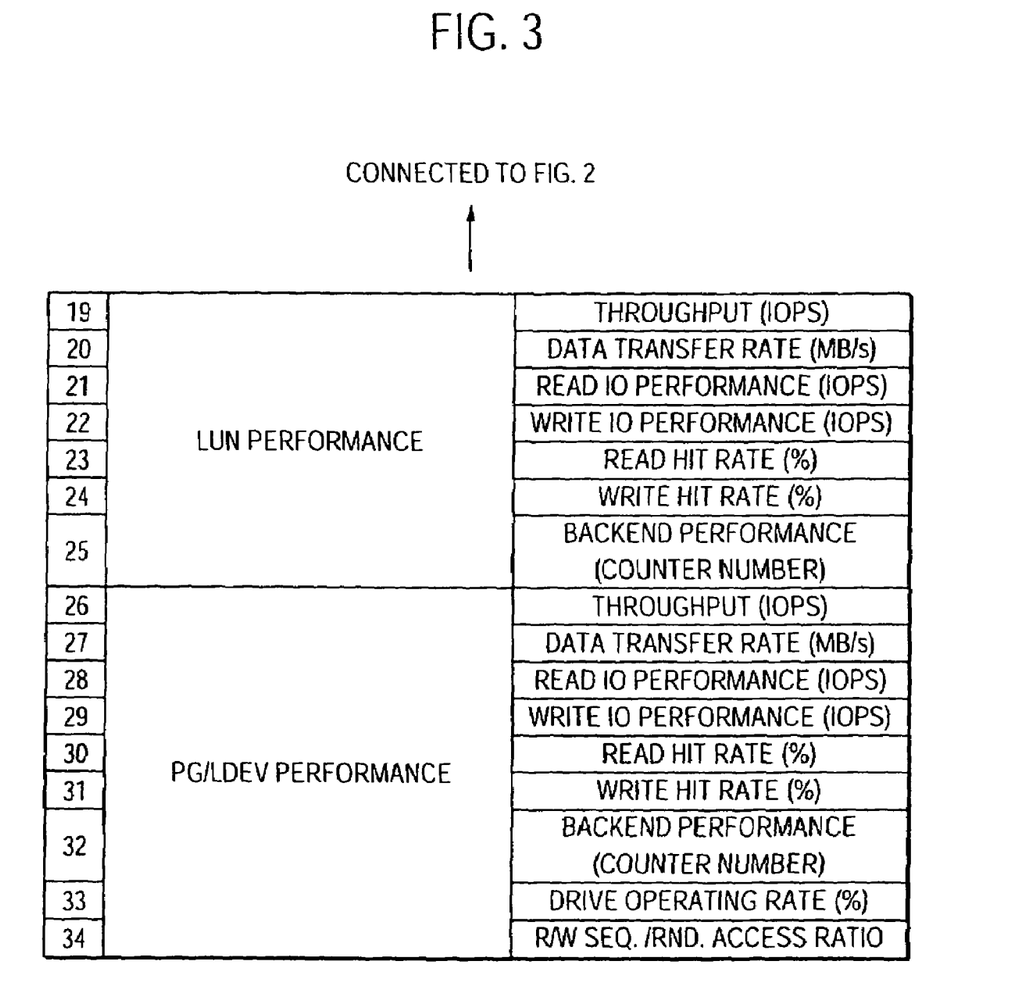
FIG. 3 shows examples of nineteenth to thirty-fourth monitor items.

Examples of first to thirty-fourth monitor items and operation information, which is used for calculating information on the monitor items, will be hereinafter described with reference to FIGS. 2 and 3. Note that the examples of the nineteenth to the twenty-fifth monitor items are examples of items in the case in which the storage control system 13 communicates with the host terminal 1 in accordance with a communication protocol of an open frame system. The examples of the sixteenth to the eighteenth and the twenty-sixth to the thirty-fourth monitor items are examples of items in the case in which the storage control system 13 communicates with the host terminal 1 in accordance with a communication protocol of a mainframe system.

First Monitor Item: CHP Operating Rate

A "CHP operating rate" means an operating rate of the CHP 36 per unit time and is represented in, for example, percent. The respective CHPs 36 write CHP operating time information, which includes at least one of an operation start time and an operation finish time of the CHPs 36, in the SM 39. The SVP 11 reads the CHP operating time information recorded by the respective CHPs 36 from the SM 39 at predetermined timing (e.g., periodically), and calculates operating rates per unit time of the respective CHPs 36 on the basis of the operating time information and displays the operating rates.

Second Monitor Item: DKP Operating Rate

A "DKP operating rate" means an operating rate of the DKP 44 per unit time and is represented in, for example, percent. The respective DKPs 44 write DKP operating time information, which includes at least one of an operation start time and an operation finish time of the DKPs 44, in the SM 39. The SVP 11 reads the DKP operating time information recorded by the respective DKPs 44 from the SM 39 at predetermined timing (e.g., periodically), and calculates operating rates per unit time of the respective DKPs 36 on the basis of the operating time information and displays the operating rates.

Third Monitor Item: DRR Operating Rate

A "DRR operating rate" means an operating rate of the DRR 46 per unit time and is represented in, for example, percent. The respective DRRs 46 write DRR operating time information, which includes at least one of an operation start time and an operation finish time of the DRRs 46, in the SM 39. The SVP 11 reads the DRR operating time information recorded by the respective DRRs 46 from the SM 39 at predetermined timing (e.g., periodically), and calculates operating rates per unit time of the respective DRRs 46 on the basis of the operating time information and displays the operating rates.

Fourth Monitor Item: Cache Use Rate

A "cache use rate" means a used storage capacity with respect to storage capacities of all the CMs 37 and is represented in, for example, percent. At least one of the CHP 36, the DKP 44, and the DRR 46 checks a cache use rate and writes the cache use rate in a predetermined storage area (e.g., a local memory of the processor) at predetermined timing (e.g., whenever necessary), and writes the cache use rate, which is in the predetermined storage area, in the SM 39 irregularly or periodically (e.g., every one minute). The SVP 11 reads the cache use rate from the SM 39 and displays the cache use rate at predetermined timing (e.g., periodically).

Fifth Monitor Item: Write Pending

"Write pending" means a ratio of data, which has not been written in the disk type storage 3, in the data in the CM 37 and is represented in, for example, percent. At least one of the CHP 36, the DKP 44, and the DRR 46 checks Write pending and writes the Write pending in a predetermined storage area (e.g., a local memory of the processor) at predetermined timing (e.g., whenever necessary), and writes the Write pending, which is in the predetermined storage area, in the SM 39 irregularly or periodically (e.g., every one minute). The SVP 11 reads the Write pending from the SM 39 and displays the Write pending at predetermined timing (e.g., periodically).

Sixth Monitor Item: Side File Usage

A "side file usage" means a ratio of a usage of a side file (to be used in a remote copy function) with respect to all the CMs 37 and is represented in, for example, percent. At least one of the CHP 36, the DKP 44, and the DRR 46 checks a side file usage and writes the side file usage in a predetermined storage area (e.g., a local memory of the processor) at predetermined timing (e.g., whenever necessary), and writes the side file usage, which is in the predetermined storage area, in the SM 39 irregularly or periodically (e.g., every one minute). The SVP 11 reads the side file usage from the SM 39 and displays the side file usage at predetermined timing (e.g., periodically). Note that the "remote copy function" means a function of, in response to a remote copy instruction from the host terminal 1, bringing an original volume and a copy volume into a paired state to copy data in the original volume into the copy volume. The remote copy function includes, for example, a "synchronous mode", in which data update in the original volume and data update in the copy volume synchronize with each other, and an "asynchronous mode", in which data update in the original volume and data update in the copy volume do not synchronize with each other. In addition, the "side file" in this specification means data for temporarily accumulating data, which is transferred from the original volume to the copy volume, on a cache at the time of remote copy, and is managed separately from usual user data.

Seventh Monitor Item: Asynchronous Mode Write Pending

"Asynchronous mode Write pending" means a side file usage (in the asynchronous mode of remote copy) with respect to all the CMs 37 and is represented in, for example, percent. At least one of the CHP 36, the DKP 44, and the DRR 46 checks asynchronous mode Write pending and writes the asynchronous mode Write pending in a predetermined storage area (e.g., a local memory of the processor) at predetermined timing (e.g., whenever necessary) and writes the asynchronous mode Write pending, which is in the predetermined storage area, in the SM 39 irregularly or periodically (e.g., every one minute). The SVP 11 reads the asynchronous mode Write pending from the SM 39 and displays the asynchronous mode Write pending at predetermined timing (e.g., periodically).

Eighth Monitor Item: Red Hit Rate

A "read hit rate" means a ratio of cache hit in all cache accesses, which correspond to all read requests, respectively, and is represented in, for example, percent. At least one of the CHP 36 and the DKP 44 checks a read hit rate and writes the read hit rate in a predetermined storage area (e.g., a local memory of the processor) at predetermined timing (e.g., whenever necessary), and writes the read hit rate, which is in the predetermined storage area, in the SM 39 irregularly or periodically (e.g., every one minute). The SVP 11 reads the read hit rate from the SM 39 and displays the read hit rate at predetermined timing (e.g., periodically).

Ninth Monitor Item: Channel Adapter SM Access Path Rate

A "channel adapter SM access path rate" means a use rate of an access path (here, a path connecting the CHA 35 and the SM 39) per unit time and is represented in, for example, percent. The respective CHPs 36 write CHA access time information, which includes at least one of an access start time and an access finish time for accessing the SM 39, in the SM 39. The SVP 11 reads the CHA access time information, which is recorded by the respective CHPs 36, from the SM 39 at predetermined timing (e.g., periodically), and calculates a channel adapter SM access path rate on the basis of the time information and displays the channel adapter SM access path rate.

Tenth Monitor Item: Disk Adapter SM Access Path Rate

A "disk adapter SM access path rate" means a use rate of an access path (here, a path connecting the DKA 43 and the SM 39) per unit time and is represented in, for example, percent. The respective DKPs 44 write DKA access time information, which includes at least one of an access start time and an access finish time for accessing the SM 39, in the SM 39. The SVP 11 reads the DKA access time information, which is recorded by the respective DKPs 44, from the SM 39 at predetermined timing (e.g., periodically), and calculates a disk adapter SM access path rate on the basis of the time information and displays the disk adapter SM access path rate.

Eleventh Monitor Item: Channel Adapter CM Access Path Rate

A "channel adapter CM access path rate" means a use rate of an access path (here, a path connecting the CHA 35 and the CM 37) per unit time and is represented in, for example, percent. The respective CHPs 36 write CHA access time information, which includes at least one of an access start time and an access finish time for accessing the CM 37, in the CM 37. The SVP 11 reads the CHA access time information, which is recorded by the respective CHPs 36, from the CM 37 at predetermined timing (e.g., periodically), and calculates a channel adapter CM access path rate on the basis of the time information and displays the channel adapter CM access path rate.

Twelfth Monitor Item: Disk Adapter CM Access Path Rate

A "disk adapter CM access path rate" means a use rate of an access path (here, a path connecting the DKA 43 and the CM 37) per unit time and is represented in, for example, percent. The respective DKPs 44 write DKA access time information, which includes at least one of an access start time and an access finish time for accessing the CM 37, in the CM 37. The SVP 11 reads the DKA access time information, which is recorded by the respective DKPs 44, from the CM 37 at predetermined timing (e.g., periodically), and calculates a disk adapter CM access path rate on the basis of the time information and displays the disk adapter CM access path rate.

Thirteenth Monitor Item: Throughput of a Port

A "throughput of a port" means the number per unit time of I/O requests, which have passed each port (not shown) to which the host terminal 1 is connected, and is represented in, for example, IOPS (IO per second, i.e., the number of I/O requests which have passed in one second). The respective CHPs 36 write a throughput of a port in the SM 39 and update the throughput at the time of processing of I/O requests. The SVP 11 reads the throughput of a port from the SM 39 and displays the throughput at predetermined timing (e.g., periodically).

Fourteenth Monitor Item: Data Transfer Rate of a Port

A "data transfer rate of a port" means a data rate which has passed each port (not shown), to which the host terminal 1 is connected, per unit time and is represented in, for example, MB/sec. On the basis of a data rate which has passed a port, the respective CHPs 36 update a data rate (information on the SM 39) corresponding to the port at the time of processing of an I/O request. The SVP 11 reads a data transfer rate of a port from the SM 39 and displays the data transfer rate at predetermined timing (e.g., periodically).

Fifteenth Monitor Item: Response Time of a Port

A "response time of a port" means an average of response time lengths from the time when one I/O request is received until the time when some response is returned for each port (not shown) to which the host terminal 1 is connected, and is represented in, for example, ms (millisecond). At the time of processing of an I/O request, the respective CHPs 36 update a response time of the port (information on the SM 39) on the basis of a response time length for the I/O request. The SVP 11 reads a response time of a port from the SM 39 and displays the response time at predetermined timing (e.g., periodically).

Sixteenth Monitor Item: Throughput of a WWN

A "throughput of a WWN" means the number per unit time of I/O requests for each WWN which has passed each port (not shown), to which the host terminal 1 is connected, and is represented in, for example, IOPS. The respective CHPs 36 write a throughput of a WWN in the SM 39 and update the throughput at the time of processing of an I/O request. The SVP 11 reads the throughput of a WWN from the SM 39 and displays the throughput at predetermined timing (e.g., periodically). Note that a "WWN" is an abbreviation of a "World Wide Name" and is an identifier which is uniquely allocated to each of one or more communication devices existing in one host.

Seventeenth Monitor Item: Data Transfer Rate of a WWN

A "data transfer rate of a WWN" means an amount of data for each WWN which has passed each port (not shown), to which the host terminal 1 is connected, per unit time and is represented in, for example, MB/sec. At the time of processing of an I/O request the respective CHPs 36 identify a WWN of a communication device, which has issued the I/O request, and updates an amount of data (information on the SM 39) corresponding to the WWN on the basis of an amount of data for the I/O request. The SVP 11 reads a data transfer rate of a WWN from the SM 39 and displays the data transfer rate at predetermined timing (e.g., periodically).

Eighteenth Monitor Item: Response Time of a WWN

A "response time of a WWN" means an average of response time lengths from the time when one I/O request is received until the time when some response is returned, and is represented in, for example, ms (millisecond). At the time of processing of an I/O request, the respective CHPs 36 update a response time (information on the SM 39) of a WWN of a communication device, which has issued the I/O request, on the basis of a response time length for the I/O request. The SVP 11 reads a response time of a port from the SM 39 and displays the response time at predetermined timing (e.g., periodically).

Nineteenth Monitor Item: Throughput of a Logical Volume (LU)

A "throughput of an LU" means the number of targeted I/O requests among I/O requests which the storage control system 13 received per unit time, and is found for each LU and represented in, for example, OPS. At least one of the CHP 36 and the DKP 44 writes a throughput in the SM 39 and updates the throughput for each LU at the time of processing of an I/O request. The SVP 11 reads the throughput for each LU from the SM 39 and displays the throughput at predetermined timing (e.g., periodically).

Twentieth Monitor Item: Data Transfer Rate of an LU

A "data transfer rate of an LU" means an amount of data stored or read out per unit time, and is found for each LU and represented in, for example, MB/sec. At least one of the CHP 36 and the DKP 44 writes a stored or read-out amount of data in the SM 39 and updates the amount of data at the time of processing of an I/O request. The SVP 11 reads the data transfer rate for each LU from the SM 39 and displays the data transfer rate at predetermined timing (e.g., periodically).

Twenty-First Monitor Item: Read Request Performance of an LU

A "read request performance of an LU" means the number of targeted read requests among read requests which the storage control system 13 received per unit time, and is found for each LU and represented in, for example, IOPS. At least one of the CHP 36 and the DKP 44 writes a read request performance and updates the read request performance for each LU at the time of processing of an I/O request. The SVP 11 reads the read request performance for each LU from the SM 39 and displays the read request performance at predetermined timing (e.g., periodically).

Twenty-Second Monitor Item: Write Request Performance of an LU

A "write request performance of an LU" means the number of targeted write requests among write requests which the storage control system 13 received per unit time, and is found for each LU and represented in, for example, IOPS. At least one of the CHP 36 and the DKP 44 writes a write request performance in the SM 39 and updates the write request performance for each LU at the time of processing of an I/O request. The SVP 11 reads the write request performance for each LU from the SM 39 and displays the write request performance at predetermined timing (e.g., periodically).

Twenty-Third Monitor Item: Read Hit Rate of an LU

A "read hit rate of an LU" means a ratio of cache hit in cache accesses which correspond to read requests for each LU, respectively, and is represented in, for example, percent. At least one of the CHP 36 and the DKP 44 writes a read hit rate in the SM 39 at the time of processing of an I/O request. The SVP 11 reads the read hit rate for each LU from the SM 39 and displays the read hit rate at predetermined timing (e.g., periodically).

Twenty-Fourth Monitor Item: Write Hit Rate of an LU

A "write hit rate of an LU" means a ratio of cache hit in cache accesses which correspond to write requests for each LU, respectively, and is represented in, for example, percent. At least one of the CHP 36 and the DKP 44 writes a write hit rate in the SM 39 at the time of processing of an I/O request. The SVP 11 writes the write hit rate for each LU from the SM 39 and displays the read hit rate at predetermined timing (e.g., periodically).

Twenty-Fifth Monitor Item: Backend Performance of an LU

A "backend performance of an LU" means the number of data transfers to an LU from the CM 37 and is represented by, for example, counter numbers for each LU. At the time of processing of I/O request (e.g. in the case where data is read out from CM 37 and stored in LU) the DKP 44 updates backend performance and writes the backend performance in the SM 39. The SVP 11 reads a backend performance for each LU from the SM 39 and displays the backend performance at predetermined timing (e.g., periodically).

Twenty-Sixth Monitor Item: Throughput of a Logical Volume (LDEV)

The "LU" in the "throughput of an LU" of the nineteenth monitor item is read as "LDEV".

Twenty-Seventh Monitor Item: Data Transfer Rate of an LDEV

The "LU" in the "data transfer rate of an LU" of the twentieth monitor item is read as "LDEV".

Twenty-Eight Monitor Item: Read Request Performance of an LDEV

The "LU" in the "read request performance" of the twenty-first monitor item is read as "LDEV".

Twenty-Ninth Monitor Item: Write Request Performance of an LDEV

The "LU" in the "write request performance of an LU" of the twenty-second monitor item is read as "LDEV".

Thirtieth Monitor Item: Read Hit Rate of an LDEV

The "LU" in the "read hit rate of an LU" of the twenty-third monitor item is read as "LDEV".

Thirty-First Monitor Item: Write Hit Rate of an LDEV

The "LU" in the "write hit rate of an LU" of the twenty-fourth monitor item is read as "LDEV".

Thirty-Second Monitor Item: Backend Performance (Counter Numbers) of an LDEV

The "LU" in the "backend performance of an LU" of the twenty-fifth monitor item is read as "LDEV".

Thirty-Third Monitor Item: Drive Operating Rate of an LDEV

A "drive operating rate of an LDEV" means a ratio of a writing time length for writing data in an LDEV per unit time and is represented in, for example, percent for each LDEV. At the time of I/O request processing (e.g., in the case of storing data in an LDEV), the DKP 44 updates a drive operating rate and writes the drive operating rate in the SM 39. The SVP 11 reads a drive operating rate for each LDEV from the SM 39 and displays the drive operating rate for each LDEV at predetermined timing (e.g., periodically).

Thirty-Fourth Monitor Item: R/W Seq./Rnd. Access Ratio

An "R/W Seq./Rnd. access ratio" is a ratio of a sequential access and a random access and is found separately for a write command and a read command for each LDEV. At the time of I/O request processing (e.g., in the case in which data is stored in an LDEV), the DKP 44 updates an R/W Seq./Rnd. access ratio on the basis of whether the I/O request is a write commando or a read command and which of sequential access and random access is performed to access which LDEV according to the command, and writes the R/W Seq./Rnd. access ratio in the SM 39. The SVP 11 reads a drive operating rate for each LDEV from the SM 39 and displays the drive operating rate at predetermined timing (e.g., periodically). Note that the "sequential access" means that data is read (or written) in order from a certain block among plural data blocks existing on disks in the disk type storage 3, and the "random access" means that data is read (or written) regardless of an arrangement order of data blocks.

In the above-mentioned examples of the first to the thirty-fourth monitor items, the first to the third monitor items belong to a heading "processor performance", the fourth to the eighth monitor items belong to a heading "cache performance value", the ninth to the twelfth monitor items belong to a heading "access path operating rate", the thirteenth to the fifteenth monitor items belong to a heading "port performance", the sixteenth to the eighteenth monitor items belong to a heading "WWN performance", the nineteenth to the twenty-fifth monitor items belong to a heading "LUN performance", and the twenty-sixth to the thirty-fourth monitor items belong to a heading "PG/LDEV performance" (incidentally, PG is an abbreviation of "Parity Group" and means a physical disk group). The maintenance terminal 11 may acquire all the monitor items from the SM 39 altogether or at different timing for each heading.

Figure 4:
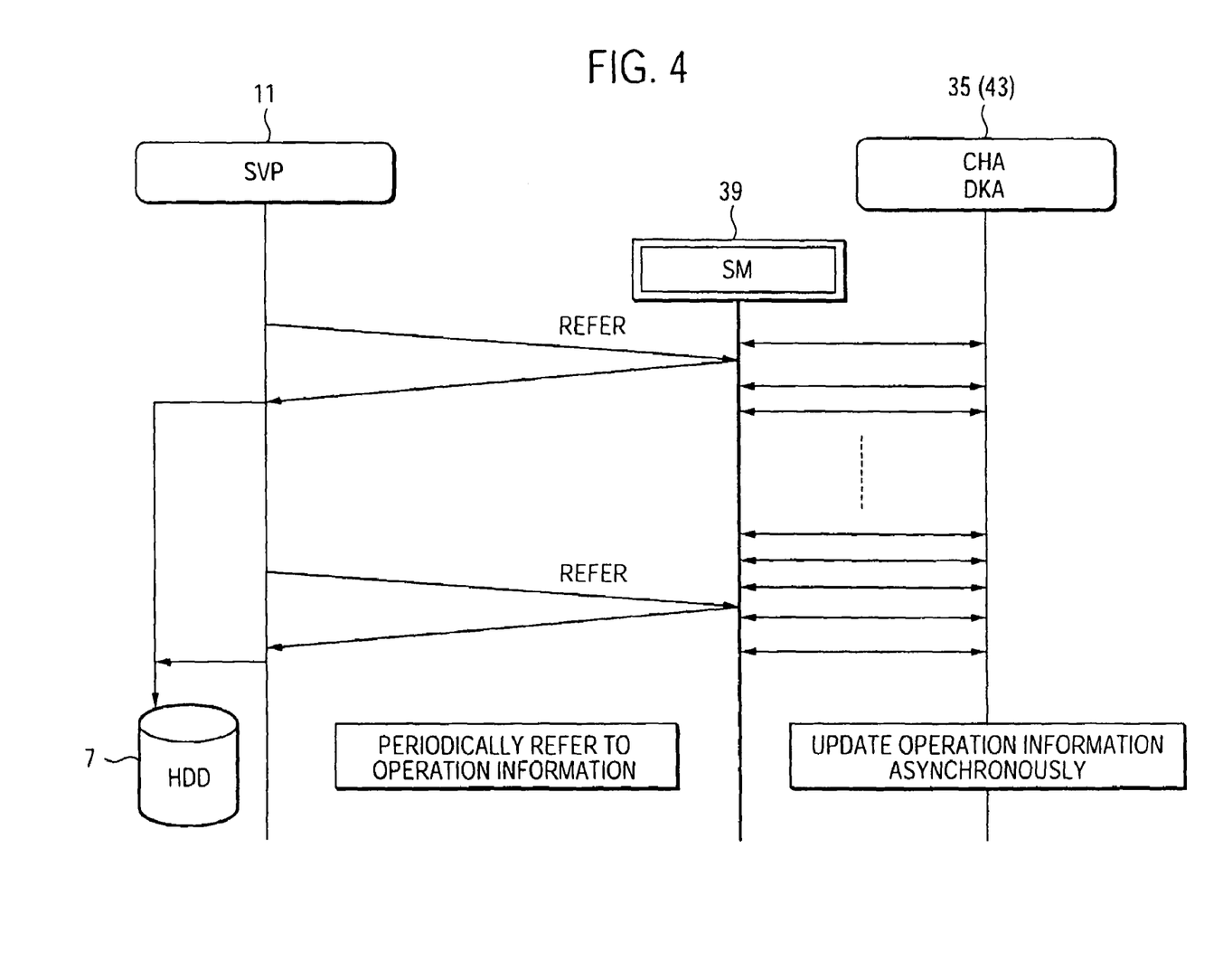
FIG. 4 shows a processing flow until operation information is stored in an SVP 11 in the first embodiment.

FIG. 4 shows a processing flow until operation information is stored in the SVP 11 in the first embodiment. The processing flow until operation information is stored in the SVP 11 will be hereinafter described with reference to FIG. 4.

The respective CHPs 36 on the respective CHAs 35 as well as the respective DKPs 44 and the respective DRRs 46 on the respective DKAs 43 store operation information, which will be a basis of at least one monitor item among the plural monitor items, in the SM 39 asynchronously with timing at which the SVP 11 reads out the operation information from the SM 39.

The SVP 11 accesses the SM 39, acquires all or a part of one or plural kinds of operation information stored in the SM 39, and stores the operation information in the HDD 7 of the SVP 11 periodically. In other words, operation information in the first storage area of the SM 39 is sent from the SM 39 to the SVP 11 in a form in which the operation information is stored in the HDD 7 of the SVP 11.

Thereafter, the SVP 11 displays one or plural monitor items based upon the operation information in the HDD 7 at predetermined timing (e.g., immediately after storing the operation information in the HDD 7).

Figure 5:
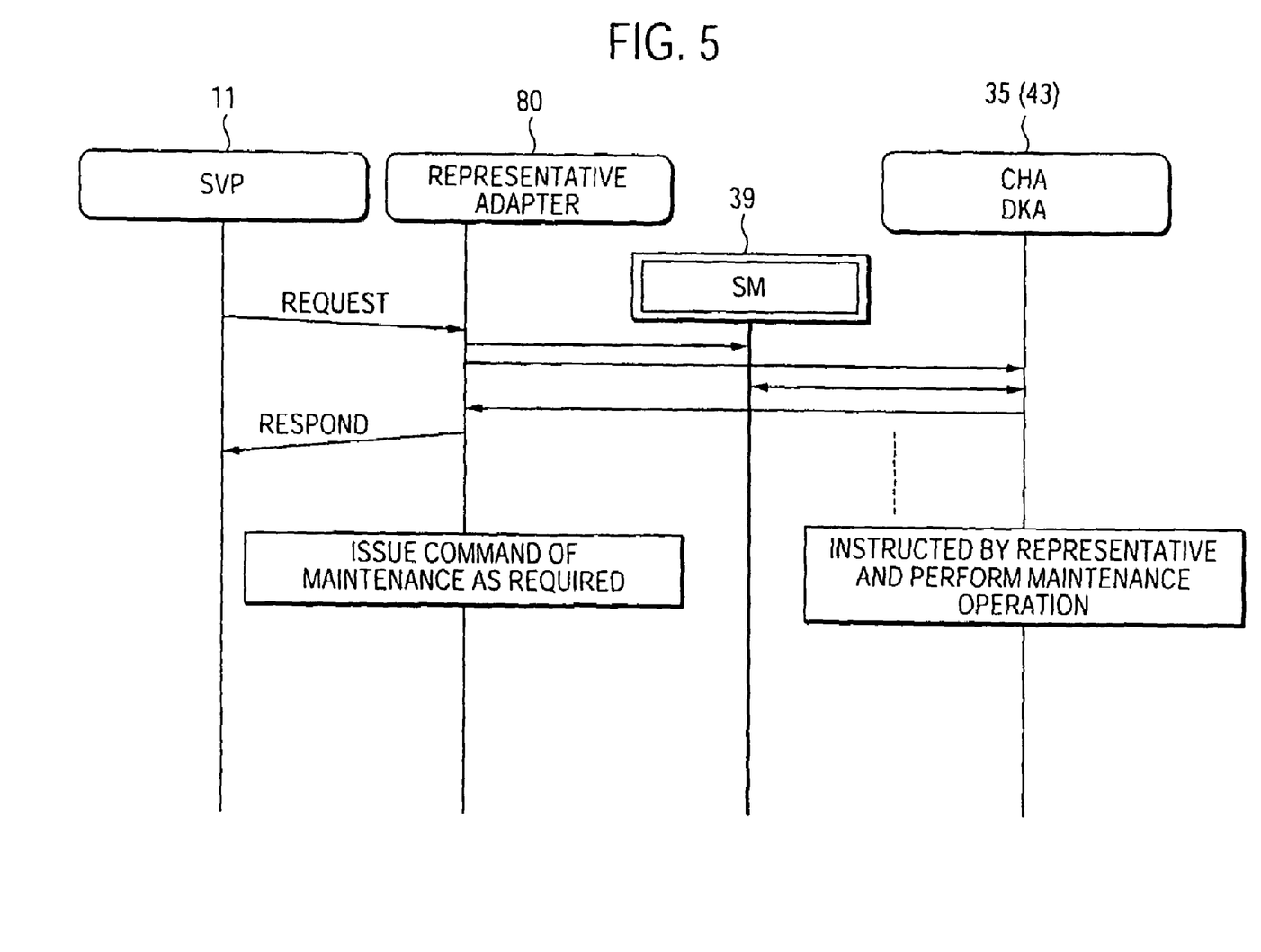
FIG. 5 shows an example of a flow of maintenance processing which is performed by the SVP 11.

FIG. 5 shows an example of a flow of maintenance processing performed by the SVP 11.

The SVP 11 sends a maintenance command corresponding to a maintenance content to be performed (e.g., a command for turning off a power supply of an adapter) to a representative adapter 80. The representative adapter 80 is one or more adapters of the plural CHAs 35 and/or the plural DKAs 43. The representative adapter 80 may be an adapter of the same type as a maintenance object adapter (e.g., in the case in which the maintenance object adapter is a CHA 35, the representative adapter 80 is another CHA 35) or may be any adapter regardless of a type of the maintenance object adapter. In addition, the representative adapter 80 may be set in advance or may be selected arbitrarily out of the plural CHAs 35 and/or the plural DKAs 43 by the SVP 11.

All or a part of predetermined processors on the representative adapter 80 write control information based upon the received maintenance command in the second storage area (storage area in which control information is written) of the SM 39.

All or a part of predetermined processors on the maintenance object adapter read the control information from the SM 39 and perform a maintenance operation based upon the control information. In addition, all or a part of the predetermined processors on the maintenance object adapter write control information for response in the second storage area of the SM 39.

All or a part of the predetermined processors on the representative adapter 80 read the control information for response from the SM 39 and send a response signal based upon the control information for response to the SVP 11.

The above is the description about the first embodiment. According to this first embodiment, since the SVP 11 acquires operation information directly from the SM 39, a communication load between the respective adapters 35 and 43 and the SVP 11 is reduced.

Next, a second embodiment of the present invention will be described. Note that, from the viewpoint of preventing the description from being redundant, the description about the same contents as the first embodiment will be omitted or simplified, and differences from the first embodiment will be mainly described.

Figure 6:
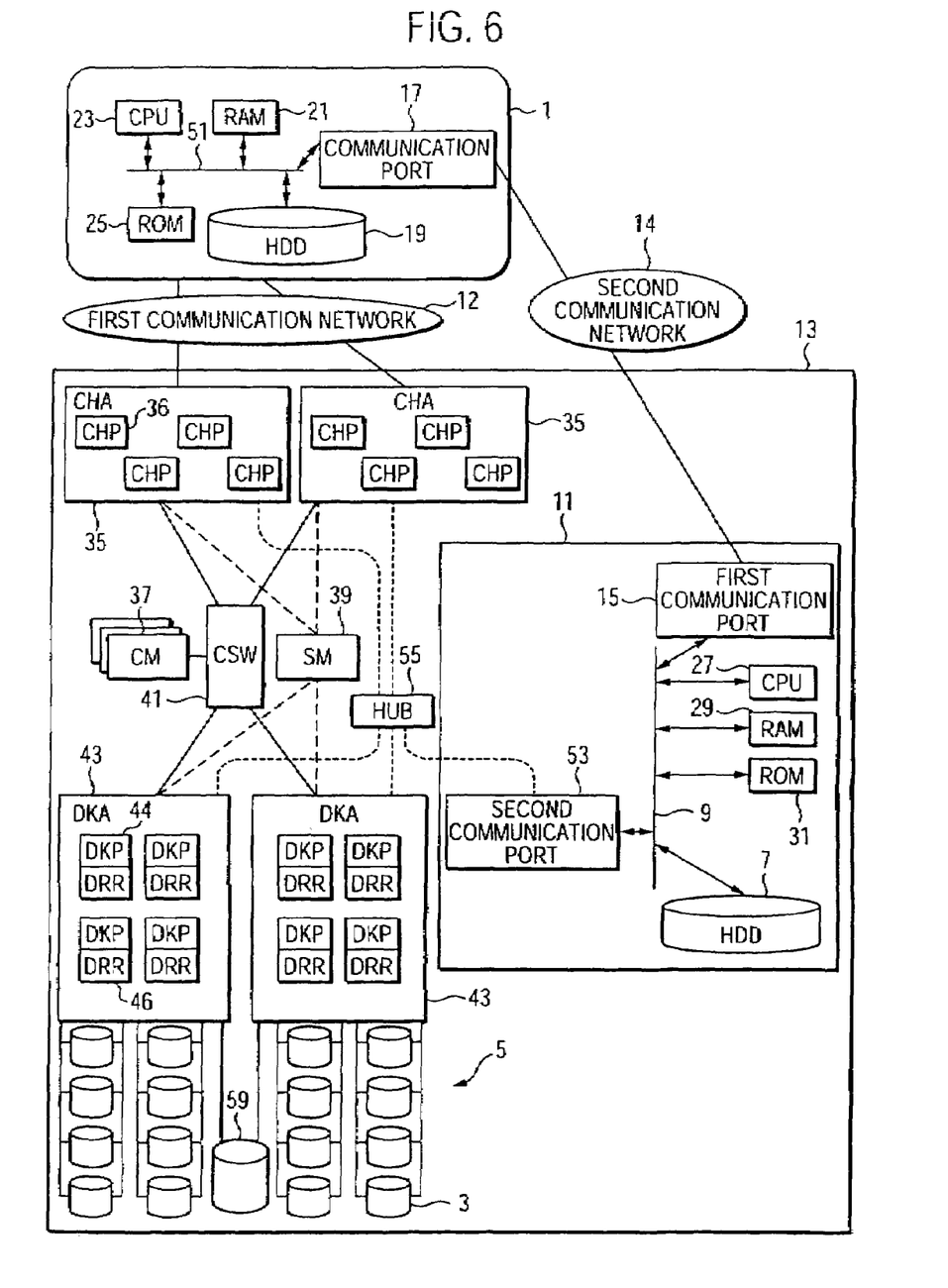
FIG. 6 shows an overall structure of a storage control system in accordance with a second embodiment of the present invention.

FIG. 6 shows an overall structure of a storage control system in accordance with the second embodiment of the present invention.

In the storage control system 13, a dedicated disk type storage in which only operation information is stored (hereinafter referred to as operation information storage) 59 is prepared separately from the disk type storages 3 in which data from the host terminal 1 is stored. The operation information storage 59 is connected to predetermined one or more DKAs (hereinafter referred to as representative DKAs 43D) of the plural DKAs 43.

Figure 7:
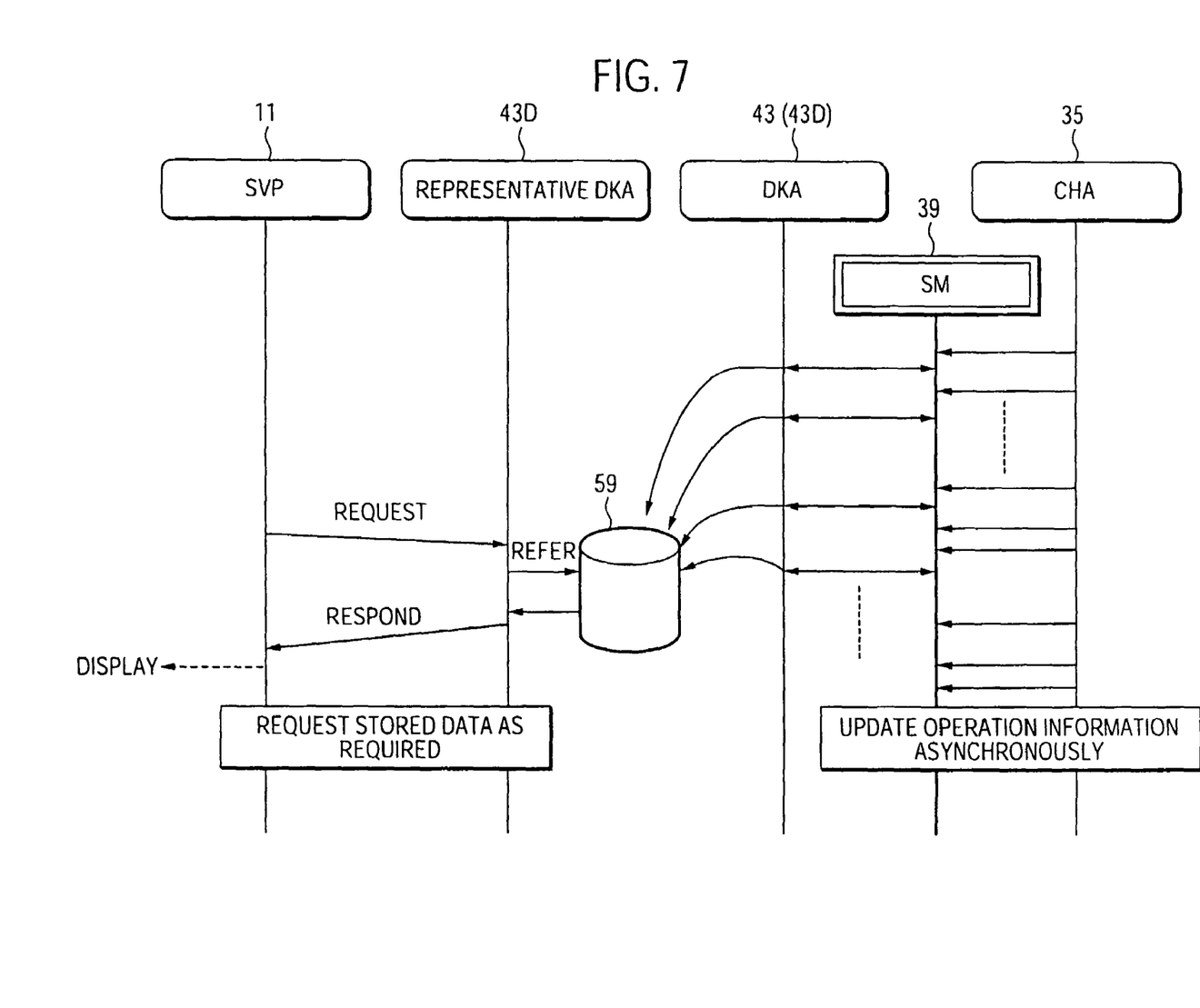
FIG. 7 shows a processing flow until the SVP 11 acquires operation information in the second embodiment.

FIG. 7 shows a processing flow until the SVP 11 acquires operation information in the second embodiment.

The respective CHPs 36 on the respective CHAs 35 as well as the respective DKPs 44 and the respective DRRs 46 on the respective DKAs 43 store operation information, which will be a basis of at least one monitor item among the plural monitor items, in the first storage area of the SM 39 asynchronously with timing at which the representative DKA 43D acquires the operation information from the SM 39.

All or a part of the predetermined DKPs 44 on the one or more representative DKAs 43 read out all or a part of operation information existing in the first storage area of the SM 39 (e.g., operation information to be a basis of plural monitor items belonging to a heading) and store the operation information in the operation information storage 59 at arbitrary or predetermined timing (e.g., periodically) (at this point, the read-out operation information may be deleted from the SM 39).

The SVP 11 requests the representative DKA 43D to read out the operation information as required (e.g., according to a request from a user or periodically).

All or a part of the predetermined DKPs 44 on the representative DKA 43 read out all or a part of operation information (e.g., operation information to be a basis of plural monitor items belonging to a heading) existing in the operation information storage 59 and send the operation information to the SVP 11 in a form in which the operation information is not stored in the HDD 7 of the SVP 11. As a result, the operation information is temporarily stored in the memory of the SVP 11, and a monitor item based upon the stored operation information is displayed on a not-shown display screen of the SVP 11.

The above is the description about the second embodiment. According to this second embodiment, operation information is transferred from the SM 39 with a smaller storage capacity to the operation information storage 59 with a larger storage capacity and stored therein according to circumstances. Then, when a monitor item based upon the operation information is displayed on the SVP 11, the operation information never squeezes the storage capacity of the HDD 7 of the SVP 11. Consequently, even if various kinds of operation information continue to increase in the storage control system 13, a burden on the SVP 11 is small.

Next, a third embodiment of the present invention will be described. Differences from the second embodiment will be hereinafter mainly described.

Figure 8:
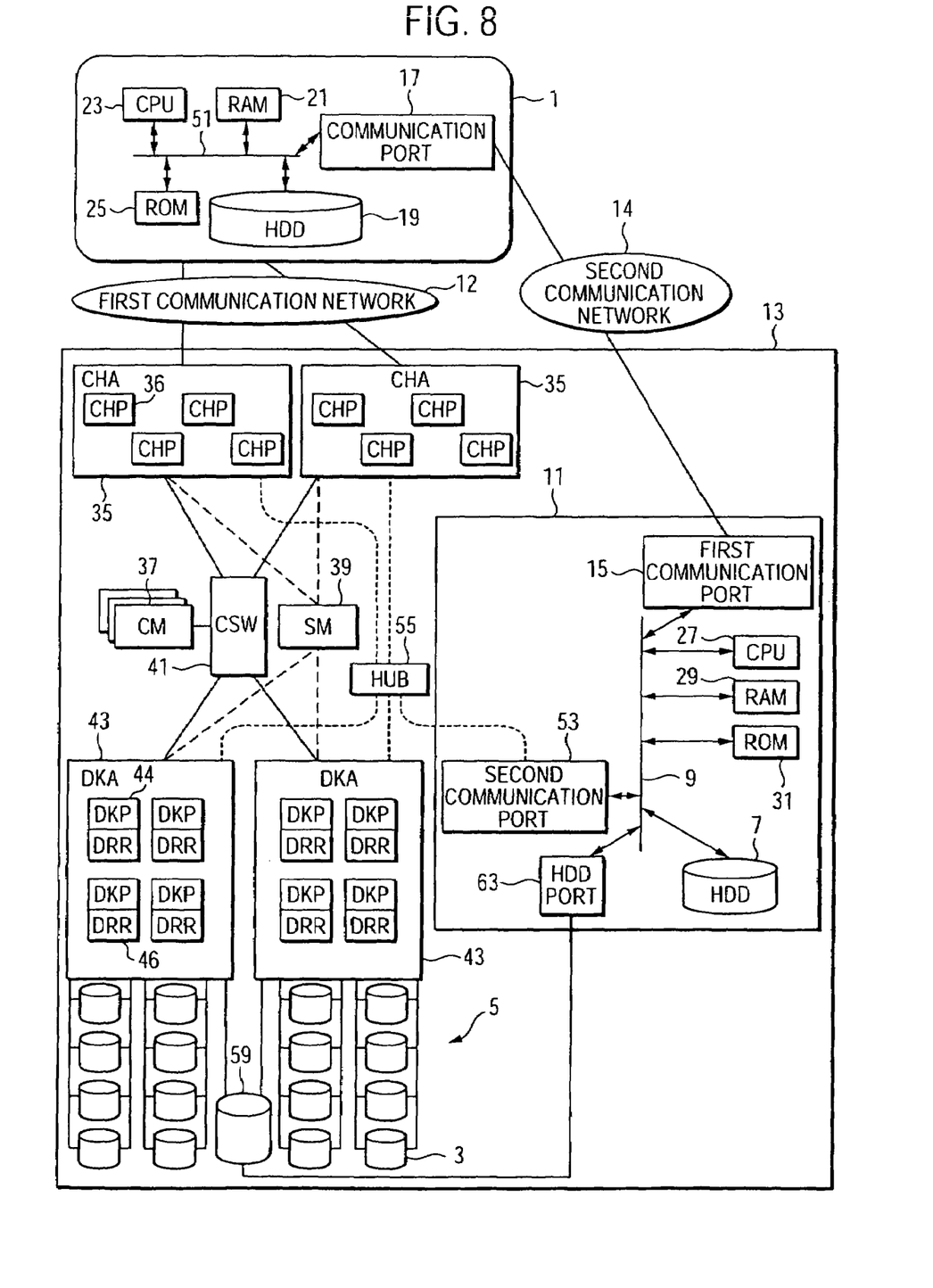
FIG. 8 shows an overall structure of a storage control system in accordance with a third embodiment of the present invention.

FIG. 8 shows an overall structure of a storage control system in accordance with the third embodiment of the present invention.

An HDD port 63 is provided in the SVP 11, and the operation information storage 59 is connected to the HDD port 63. Consequently, the SVP 11 can acquire operation information from the operation information storage 59 directly without the intervention of the representative DKA 43D.

Figure 9:
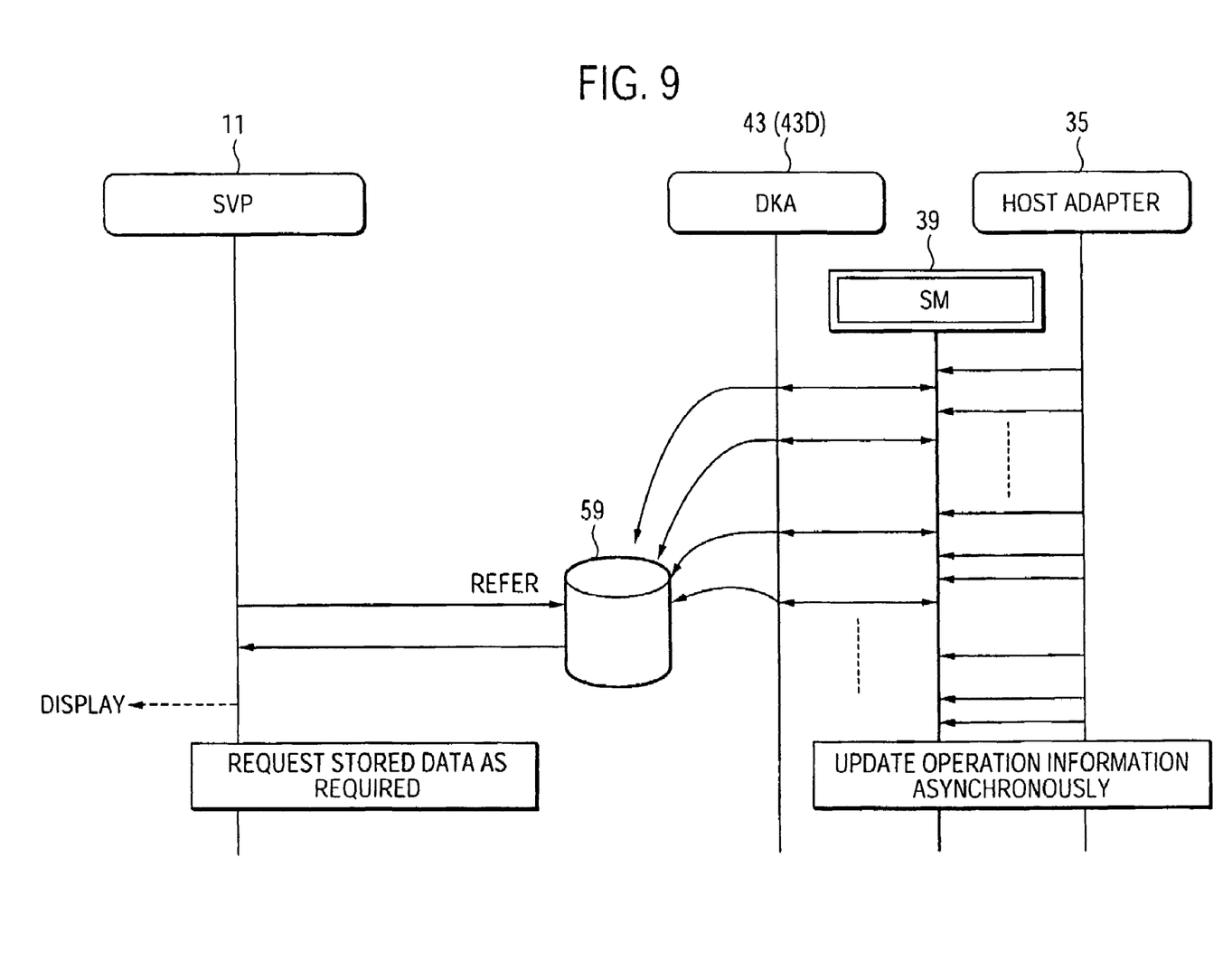
FIG. 9 shows a processing flow until the SVP 11 acquires operation information in the third embodiment.

FIG. 9 shows a processing flow until the SVP 11 acquires operation information in the third embodiment.

The respective CHPs 36 on the respective CHAs 35 as well as the respective DKPs 44 and the respective DRRs 46 on the respective DKAs 43 store operation information, which will be a basis of at least one monitor item among the plural monitor items, in the first storage area of the SM 39 asynchronously with timing at which the representative DKAs 43D acquire the operation information from the SM 39.

All or a part of the predetermined DKPs 44 on the one or more representative DKAs 43 read out all or a part of operation information existing in the first storage area of the SM 39 (e.g., operation information to be a basis of plural monitor items belonging to a heading) and store the operation information in the operation information storage 59 at arbitrary or predetermined timing (e.g., periodically) (at this point, the read-out operation information may be deleted from the SM 39).

The SVP 11 may access the operation information storage 59 via the HDD port 63, acquire the operation information in the storage 59, and display a monitor item based upon the operation information as required (e.g., according to a request from a user or periodically). In other words, all or a part of operation information existing in the operation information storage 59 is sent from the operation information storage 59 to the SVP 11 in a form in which the operation information is not stored in the HDD 7 of the SVP 11. As a result, the operation information is temporarily stored in the memory of the SVP 11, and a monitor item based upon the stored operation information is displayed on a not-shown display screen of the SVP 11.

Figure 10A:
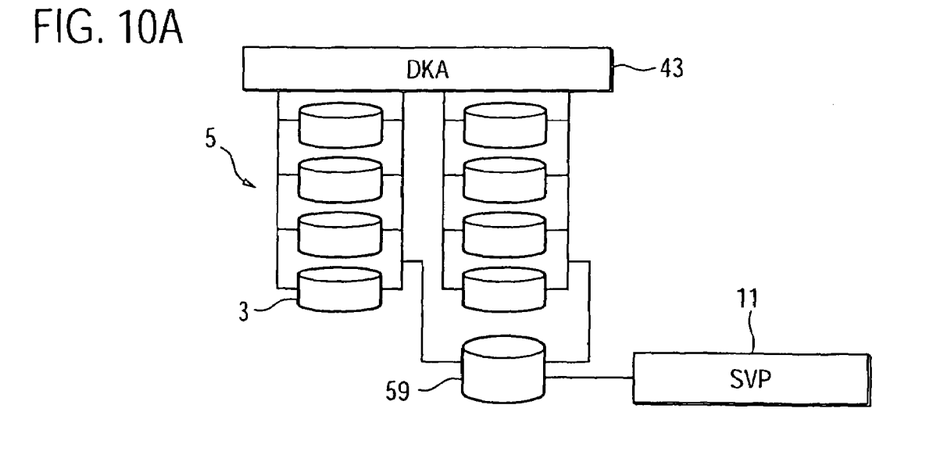
FIGS. 10A to 10C show examples of a connection form between the SVP 11 and disk type storages.
Figure 10B:
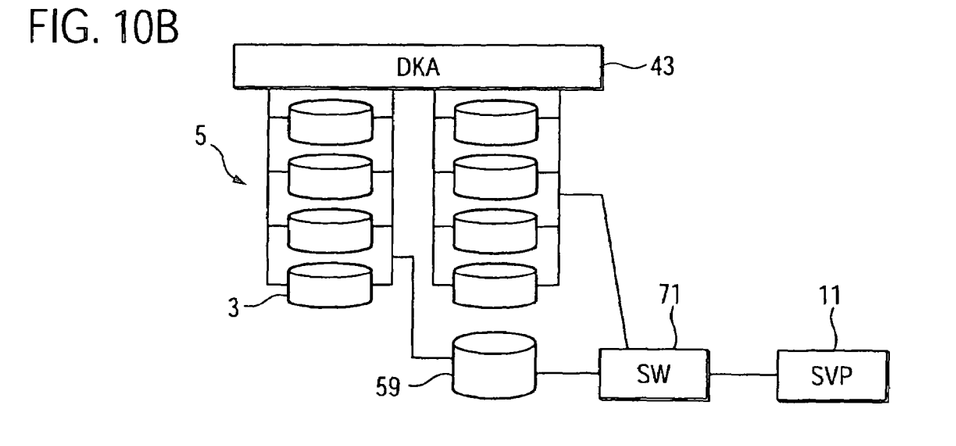
Figure 10C:
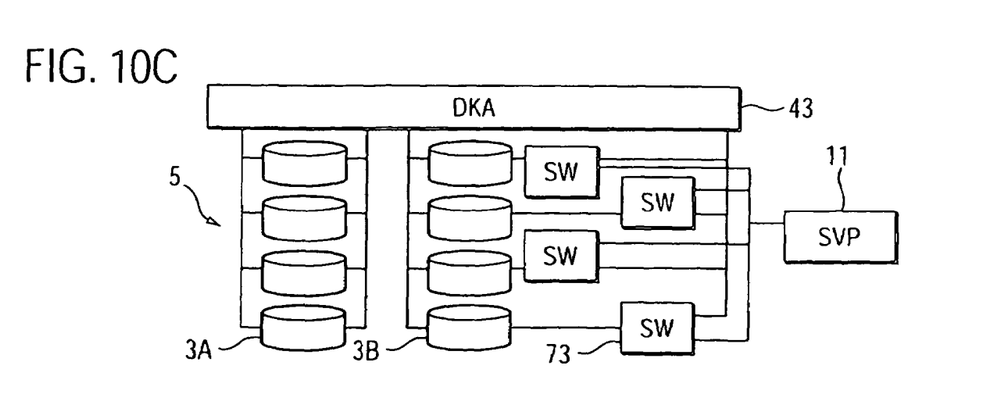

In this third embodiment, for example, the SVP 11 can be connected to the operation information storage 59 in one of the three forms shown in FIG. 10.

In other words, for example, as shown in FIG. 10A, whereas the disk type storage 3 includes two connection ports, it is possible that the operation information storage 59 includes three connection ports, first and second connection ports of which are connected to the representative DKA 43D and third connection port is connected to the SVP 11.

In addition, for example, as shown in FIG. 10B, it is also possible that, as in the disk type storage 3, the operation information storage 59 includes two connection ports, first connection port of which is connected to the representative DKA 43D and second connection port of which is connected to the SVP 11 via a switch 71 connected to the representative DKA 43D.

Further, for example, as shown in FIG. 10C, it is also possible that, instead of physically providing the operation information storage 59 separately, two or more disk type storages 3A, in which operation information is never stored, and two or more disk type storages 3B, in which operation information is stored, are included in the plural disk type storages 3. In that case, it is also possible that the respective disk type storages 3B include two connection ports, a first connection port of which is connected to the DKA 43 and a second connection port of which is connected to the SVP 11 via a switch 73 connected to the DKA 43. Consequently, the SVP 11 can directly access a desired disk type storage 3B among the two or more disk type storages 3B.

The above is the description about the third embodiment.

According to this third embodiment, since the SVP 11 acquires operation information directly from the operation information storage 59 (or the disk type storage device 3B), a communication load between the respective adapters 35 and 43 and the SVP 11 is reduced.

In addition, according to this embodiment, operation information is transferred from the SM 39 with a smaller storage capacity to the operation information storage 59 (or the disk type storages 3B) with a larger storage capacity and stored therein according to circumstances. Then, when a monitor item based upon the operation information is displayed on the SVP 11, the operation information never squeezes the storage capacity of the HDD 7 of the SVP 11. Consequently, even if various kinds of operation information continue to increase in the storage control system 13, a burden on the SVP 11 is small.

Incidentally, in the above-mentioned first to third embodiments, modifications described below are possible.

For example, in the first to the third embodiments, the SM 39 may not be provided. Instead, the first storage area (an area where operation information is stored) of the SM 39 may exist in another storage medium (e.g., the CM 37).

In addition, for example, in the first to the third embodiments, plural sub-storage areas corresponding to plural kinds of operation information, respectively, may exist in the first storage area of the SM 39. For example, in the first embodiment, it is possible that the respective processors (e.g., local memories of the processors) on the CHA 35 and the DKA 43 or the SVP 11 (e.g., the memory of the SVP 11) store information on which operation information corresponds to which sub-storage area, and write and read out the respective kinds of operation information on the basis of the stored information.

Moreover, for example, in the second to the third embodiments, plural sub-storage areas (e.g., logical volumes) corresponding to plural kinds of operation information, respectively, may exist in the operation information storage 59 (or the disk type storage 3B). For example, in the second embodiment, it is possible that the respective processors (e.g., local memories of the processors) on the representative DKA 43D or the SVP 11 (e.g., the memory of the SVP 11) store information on which operation information corresponds to which sub-storage area, and write and read out the various kinds of operation information on the basis of the stored information.

In addition, for example, in the second and the third embodiments, the operation information storage 59 may be detachably mountable to the storage control system 13. Further, the operation information storage 59 may be carried and connected to an information processing terminal. In that case, the information processing terminal may read out operation information in the connected operation information storage 59 and perform processing such as analysis of the operation information.

Moreover, for example, in the first to the third embodiments, many pieces of operation information existing in the SM 39 or the operation information storage 59 may be read out altogether or may be read out in plural times.

The several embodiments and modifications of the present invention have been described. However, these are illustrations for explaining the present invention and are not intended to limit the scope of the present invention to these embodiments and modifications. It is also possible to carry out the present invention in various other forms.

For example, in the storage control system in accordance with the second aspect of the present invention (hereinafter referred to as second system), the second disk adapter may read out the operation information from the operation information storage and sends the operation information to the maintenance terminal.

For example, in the second system, it is also possible that the operation information storage is connected to the maintenance terminal, and the operation information stored in the operation information storage is read out by the maintenance terminal.

In addition, for example, in the second system, the operation information storage may be detachably mountable to the storage control system.

Further, in the second system, the operation information storage is a storage which is physically different from the host data storage, and it is possible that:

(1) the operation information storage includes first to third connection sections, the first and the second connection sections of which are connected to the second disk adapter, and the third connection section of which is connected to the maintenance terminal; or (2) the operation information storage includes first and second connection sections, the first connection section of which is connected to the second disk adapter and the second connection section of which is connected to the maintenance terminal via a switch connected to the second disk adapter.

Moreover, for example, according to the second system, it is also possible that the operation information storage is a storage, which is also used as a storage of the host data, and has first and second connection sections, the first connection section of which is connected to the second disk adapter and the second connection section of which is connected to the maintenance terminal via a switch connected to the second disk adapter. In that case, a first logical volume, in which data from a host is stored, and a second logical volume, in which operation information is stored, may exist in the operation information storage.

What is claimed is:

1. A storage control system which is connected to a host apparatus and a maintenance terminal, the storage control system comprising:
   one or more channel adapters to be a communication interface with respect to the host apparatus;
   one or more host data storages in which data from the host apparatus is stored;
   one or more operation information disk type storages in which operation information of the storage control system is stored;
   one or more operation information storage memories in which operation information of the storage control system is stored;
   one or more first disk adapters to be a communication interface with respect to the one or more host data storages; and
   one or more second disk adapters to be a communication interface with respect to the one or more operation information disk type storages,
   wherein the maintenance terminal has a disk type storage,
   the operation information is information that represents an operation state of the storage control system during a storage control system operation, and is used for management of the storage control system,
   one or more channel processors are mounted to the respective channel adapters,
   one or more first disk processors are mounted to the respective first disk adapters,
   the respective channel processors and the respective first disk processors store operation information in the one or more operation information storage memories asynchronously with timing at which the operation information read out from the one or more operation information storage memories,
   the one or more second disk adapters read out the stored operation information from the one or more operation information storage memories to store the operation information in the one or more operation information disk type storages,
   the storage control system outputs the stored operation information from the one or more operation information disk type storages to the maintenance terminal, and
   the maintenance terminal receives the operation information from the one or more operation information storage memories, and displays information based upon the received operation information without storing the operation information in the disk type storage of the maintenance terminal.

2. A storage control system according to claim 1, wherein the one or more second disk adapters read out the operation information from the one or more operation information disk type storages and send the operation information to the maintenance terminal.

3. A storage control system according to claim 1, wherein the one or more operation information disk type storages are connected to the maintenance terminal, and the operation information stored in the one or more operation information disk type storages is read out by the maintenance terminal.

4. A storage control system according to claim 1, wherein the one or more operation information disk type storages are detachably mountable.

5. A storage control system according to claim 1, wherein the one or more operation information disk type storages are physically different from the host data storages, and include:

(1) first, second, and third connection sections, the first and the second connection sections being connected to the one or more second disk adapters, and the third connection section being connected to the maintenance terminal; or (2) first and second connection sections, the first connection section being connected to the one or more second disk adapters, and the second connection section being connected to the maintenance terminal via a switch connected to the one or more second disk adapters.

6. A storage control system according to claim 1, wherein the one or more operation information disk type storages are used also as the one or more host data storages, and include first and second connection sections, the first connection section is connected to the one or more second disk adapters and the second connection section is connected to the maintenance terminal via a switch connected to the one or more second disk adapters.

* * * * *